(12) United States Patent
Luis Alonso et al.

(10) Patent No.: US 11,624,507 B2
(45) Date of Patent: Apr. 11, 2023

(54) FOOD COOKING UNIT

(71) Applicants: PAELLAS ALTA PRECISION, S.L., Barcelona (ES); INBROOLL INDUSTRIES, SL, Palol de Revardit (ES)

(72) Inventors: Juan Francisco Luis Alonso, Barcelona (ES); Jaume De Palol Masdevall, Banyoles (ES); Marc Font Ventura, Cervia de Ter (ES); Sergi Escola Lopez, El Vendrell (ES); Rafael Hesse, Bescano (ES)

( * ) Notice: Subject to any disclaimer, the term of this patent is extended or adjusted under 35 U.S.C. 154(b) by 364 days.

(21) Appl. No.: 16/761,832

(22) PCT Filed: Nov. 2, 2018

(86) PCT No.: PCT/ES2018/070707
§ 371 (c)(1),
(2) Date: May 6, 2020

(87) PCT Pub. No.: WO2019/086743
PCT Pub. Date: May 9, 2019

(65) Prior Publication Data
US 2021/0199303 A1    Jul. 1, 2021

(30) Foreign Application Priority Data

Nov. 6, 2017  (ES) ................................. U201731346
Nov. 6, 2017  (ES) ................................. U201731347

(51) Int. Cl.
| F23D 14/72 | (2006.01) |
| F24C 3/12 | (2006.01) |
| F23N 1/00 | (2006.01) |
| F24C 15/10 | (2006.01) |

(Continued)

(52) U.S. Cl.
CPC ............ *F24C 3/126* (2013.01); *F23D 14/725* (2013.01); *F23N 1/005* (2013.01); *F24C 15/107* (2013.01);
(Continued)

(58) Field of Classification Search
CPC ...... F24C 3/126; F24C 15/107; F23D 14/725; F23D 2208/10; F23D 2900/14062;
(Continued)

(56) References Cited

U.S. PATENT DOCUMENTS

| 5,693,248 A * | 12/1997 | Kim ..................... H05B 6/6447 |
| | | 219/757 |
| 2002/0045142 A1 * | 4/2002 | Repper .............. H03K 17/9622 |
| | | 431/66 |

(Continued)

FOREIGN PATENT DOCUMENTS

| CN | 1691842 A | 11/2005 |
| CN | 104487772 A | 4/2015 |

(Continued)

*Primary Examiner* — Avinash A Savani
(74) *Attorney, Agent, or Firm* — Eugenio J. Torres-Oyola; Victor M. Rodriguez-Reyes; Rafael Rodriguez-Muriel (57) ABSTRACT

Food cooking unit composed of gas burners (1), regulation electrovalves (3) of the supplied gas; an infrared sensor (5) focused towards the cooking zone; a thermocouple (6) in thermal contact with the flames and in connection with a safety electrovalve (4) through a relay (10) and an electronic control device (7) connected to said infrared sensor (5), to said at least one regulating electrovalve (3) and the relay (10) and that stores different regulation programs and that regulates the regulating electrovalve (3) and/or interrupts the thermocouple connection with the safety electrovalve in response to the signals obtained from the infrared sensor (5) and/or the thermocouple (6), and issues warnings in response to signals from the thermocouple (6).

20 Claims, 5 Drawing Sheets

(51) Int. Cl.
*G01C 9/02* (2006.01)
*G01G 19/52* (2006.01)
*G01J 5/00* (2022.01)
*G01K 7/04* (2006.01)

(52) U.S. Cl.
CPC .............. *G01C 9/02* (2013.01); *G01G 19/52* (2013.01); *G01J 5/0003* (2013.01); *G01K 7/04* (2013.01); *F23D 2208/10* (2013.01); *F23D 2900/14062* (2013.01)

(58) Field of Classification Search
CPC . F23N 1/005; G01C 9/02; G01G 19/52; G01J 5/0003; G01K 7/04
USPC .......................................................... 99/331
See application file for complete search history.

(56) References Cited

U.S. PATENT DOCUMENTS

2015/0150404 A1* 6/2015 Albizuri Landazabal ................... A47J 37/0713 126/25 R
2017/0215231 A1* 7/2017 Doerk ................... H05B 3/744

FOREIGN PATENT DOCUMENTS

| | | |
|---|---|---|
| DE | 9312396 U1 | 10/1993 |
| EP | 2856033 A1 | 4/2015 |
| JP | 4193138 B2 | 12/2008 |
| WO | 2017/013558 A1 | 1/2017 |
| WO | 3101262 A1 | 12/2017 |

* cited by examiner

FOOD COOKING UNIT

TECHNICAL FIELD

The present invention concerns to a food cooking unit equipped with one or multiple gas burners controlled through one or more regulating electrovalves, a thermocouple to detect accidental shutdown of the gas burners, and an infrared sensor located above the cooking zone and focused towards the same, and an electronic control device, connected to said infrared sensor and thermocouple, allowing automatic regulation of the heat source, or a closing of a safety electrovalve following a program stored in the electronic control device, in response to readings from the infrared sensor and/or thermocouple.

The electronic control device used in this invention can integrate a programmable device such as a PLC and will generally comprise a control unit that integrates a microcontroller or the like with memories, that provides an electronic control unit and that operates in functions of control from signal inputs from various detectors/sensors, in safety and management functions, through storage, for example of recipes and monitoring of cooking programs.

Consequently, in this memory, an electronic control device or control unit will be used interchangeably to refer to the same device.

STATE OF THE ART

Cooking units equipped with an infrared sensor and an electronic control device which allows regulating several gas burners that define a cooking zone based on the readings of the infrared sensor, are known.

For example, the document DE4422354 is known, and it describes a cooking unit equipped with an infrared sensor located above the cooking zone, oriented to read the temperature of the side wall of a cookware arranged in the cooking zone. This solution only allows knowing the temperature of a peripheral region of a cookware, but not the temperature of the food contained within said cookware. Therefore if, for example, the cookware was off-centre heating one side more than the other, the infrared sensor would give erroneous readings and therefore would not allow a correct regulation of the heat source.

The document CN104266233 also describes a similar device, but in which the infrared sensor is arranged at a higher height, oriented to capture the temperature inside a cookware arranged above the cooking zone. In this case, better regulation is achieved from the heat source, but as the infrared sensor is higher than the cooking zone, there is a risk that said infrared sensor could be damaged by high temperatures, for example, by cooking with flambé, by accidental contact of a hot cookware with said infrared sensor, by the release of vapours or by splashing oils or other liquids at high temperatures from the surface of the food under cooking. Any of these circumstances could damage the sensor or its housing or protector, especially if the sensor is located vertically or on the vertical periphery of the cooking zone The risk of damaging the infrared sensor could be reduced by moving the infrared sensor away from the heat source, but then it becomes difficult for the infrared sensor and the other components of the cooking unit to form a compact or transportable unit.

A cooking unit equipped with annular and concentric gas burners that define a cooking zone controlled by an infrared sensor is also known in the market, the gas burners being connected to electrovalves controlled by an electronic control device.

However, in the known background, there is a common problem related to the safety shutdown of the gas flow that feeds the gas burners in the event of accidental shutdown thereof.

Usually a thermocouple is used next to a gas ignition flame, connected to a safety electrovalve that determines the closure of the gas supply when the thermocouple cools due to the flame extinguishing, thus preventing uncontrolled gas escape. However, the power of the electrical signal generated by said thermocouple is extremely low, on the order of 0.25 A and 5 mV, and said electrical signal suffers significant losses due to resistance of the components during their transportation and connection with the safety electrovalve. Therefore, the electrical signal that reaches the safety electrovalve is extremely weak and false positives that close the gas passage unduly, interrupting the cooking of food are very frequent.

Furthermore, the electrical signal produced by the thermocouple must be able to activate the safety electrovalve, but such a weak signal often presents problems in producing said activation.

This typically used solution also causes the safety electrovalve to be controlled from the thermocouple and not from the control device, which has no information on the state of said safety electrovalve or the gas burner flame, so it does not know when cooking has been interrupted by a shutdown of the safety electrovalve caused by an interruption of the thermocouple signal.

The document EP2703723 describes a cooking unit equipped with a plurality of gas burners, each integrating a thermocouple. The thermocouples are connected to an electronic control unit, and this determines the closing of the safety electrovalve in case an accidental shutdown of the gas burners is detected through the signal generated by the thermocouples. In this solution, the safety electrovalve is governed by the control unit, and not by the thermocouple, which is why said control unit is part of the cooking unit's safety systems and therefore must be certified and comply high reliability requirements that make it more expensive.

There is no known solution that prevents the accidental shutdown of the cooking unit and at the same time allows a complete voluntary closing of the cooking unit, guaranteeing that gas leaks do not occur due to an accidental shutdown of the flame, without the need for a complex and expensive electronic control unit certified as security equipment.

In the known products, in addition, for the regulation of the gas flow supplied to the gas burners, fixed-pitch electrovalves are commonly used. Typically, for example, two fixed-pitch electrovalves (maximum and minimum) are provided that allow supplying a different gas flow to the same burner, so that using one electrovalve, the other, or a combination of both, different flow regulations are achieved. Although fixed-pitch electrovalves are cheaper than variable-pitch electrovalves, a greater number of electrovalves are required to achieve precise control of the cooking unit, in addition to requiring complex pipes that allow connecting two electrovalves to the same gas burner. All this ends up increasing the price and increasing the size of the cooking unit.

It is therefore necessary to improve the mentioned cooking units to avoid the aforementioned problems.

BRIEF DESCRIPTION OF THE INVENTION

The present invention concerns to a food cooking unit consisting of:

at least one gas burner associated with an ignition source and over which a cooking zone is defined to which the at least one gas burner applies heat;

at least one regulating electrovalve that regulates a flow of gas supplied to said at least one gas burner;

at least one infrared sensor located above the cooking zone and focused towards said cooking zone for remote detection of the temperature of a food cooked in said cooking zone;

an electronic control device or control unit, connected to said at least one infrared sensor and to said at least one regulating electrovalve for its control and regulation;

a thermocouple in thermal contact with the flames that apply heat to the cooking zone and in connection with a safety electrovalve to close the gas flow in the event of extinguishing the flames that apply heat to the cooking zone;

It will be understood that the cooking area is intended for the placement of a cookware on said cooking area, arranging food to be cooked inside.

The cooking area may also be defined by cookware supports located above the gas burner or burners and intended to support a cookware.

The infrared sensor, being above the cooking zone, preferably on one side of it, will be focused downwards towards said cooking zone.

It is proposed that, according to one embodiment, the horizontal component of the distance between the infrared sensor and the centre of the cooking zone is greater than the vertical component of that same distance. Preferably said vertical component will measure at least 10 cm.

It is also contemplated that the cooking unit is configured for cooking using low-height utensils such as paellas or pans, griddles, or woks. For this reason, the horizontal component of the distance between the infrared sensor and the centre of the cooking zone will be greater than the vertical component of that same distance, so that when placing a low height utensil, the infrared sensor can detect the food temperature (any part of the exposed surface) contained within said cookware.

The proposed cooking unit also includes the following features:

the electronic control device stores different regulation programs of the regulation and safety electrovalves, the thermocouple is connected to the safety electrovalve through a relay, which in turn is connected to the control device;

the control device is configured to regulate said at least one regulation electrovalve and to close the safety electrovalve in application of one of the regulation programs and/or in response to the signals obtained from the infrared sensor and/or the thermocouple;

the control device is configured to issue warnings in response to thermocouple signals corresponding to a safety valve close signal.

Thus, it is proposed that the thermocouple is directly connected to the safety electrovalve so that the signal generated by the thermocouple is transmitted directly to the safety electrovalve, but passing through the relay, and so that the control device detects the signal transmitted by said thermocouple through said relay. This allows the control device to issue a warning when the safety electrovalve closes due to accidentally extinguishing the flame. This warning can be a sound and/or light warning to the user and allow cooking to resume correctly.

The control device cannot prevent the safety electrovalve from closing in the event that the thermocouple interrupts the signal emission due to the flame extinguishing but is capable of detecting the state of the flame and acting accordingly.

In the present invention, it is proposed to interpose between the thermocouple and the safety electrovalve only one relay, and furthermore it is proposed that said relay is oversized in power, that is, intended to transmit electrical currents of a much higher intensity, which minimizes losses of the signal that the relay passes through.

Thus, the control device additionally integrates a system to interrupt said thermocouple signal by acting on the relay and thus being able to cause the safety electrovalve to close, causing the intentional shutdown of the gas burners. Said system is made up of said electrical relay activated by the control system and preferably oversized in power, for example by a factor of at least 100, or preferably oversized by at least a factor of 1000, to minimize signal losses.

As has been indicated a frequent problem in cooking units of this type is that the signal generated by the thermocouple is extremely weak, and this, combined with the losses caused by said signal during its transmission to the safety electrovalve, causes false positives that unnecessarily interrupt cooking. This loss of signal is especially significant in each electrical connection and in each device interposed between the thermocouple and the safety electrovalve, such as switches or the like.

Preferably said relay will be integrated in a printed circuit board that integrates the control device, thus saving connections and connection cables, and therefore reducing power losses.

The control unit may only detect the passage of a signal through said relay, or act on it to interrupt said signal, but in no case may it generate a signal in the relay that is transmitted to the safety electrovalve, replacing the signal generated by the thermocouple. This allows the control unit not to be part of the safety unit of the cooking unit, since its failure would not prevent the correct operation of the communication between the thermocouple and the safety electrovalve, therefore allowing the use of a simple and economic control unit.

This solution reduces the risk of false positives and therefore the risk of accidental shutdown. Furthermore, it allows the control device itself to be used to control the complete switching on and off of the control unit, for example at the user's request or at the end of cooking.

The proposed solution of including a relay between the thermocouple and the electrovalve, said relay being controlled by the control unit, in addition to avoiding "false positives", can delay them at will for a certain time of confirmation, so that they do not act (in in the event of a punctual air flow, or other minor incidents) cutting off the gas supply, except when an uncontrolled gas leak actually occurs, establishing maximum and minimum margins adaptable to the industrial regulations for the approval of the cooking unit.

According to another aspect of the invention, the use of a single variable pitch regulating electrovalve is also proposed to control the gas flow of each individual gas burner. For example, if there are three burners, there will be three regulation valves with variable pitch. This simplifies the required gas connections and reduces the size and cost of the assembly compared to a solution based on a combination of several combined fixed-pitch electrovalves for the control of each independent gas burner.

According to a proposed embodiment, the electronic control device also has a data input for modifying the stored regulation programs. Said data input is understood to be a physical data connection, such as a USB, LAN or similar input, or a wireless data connection, such as WIFI, BLUETOOTH or the like.

The data input may also be used to control a plurality of identical cooking units centrally or remotely through said data input.

It will be understood that said data input can be integrated in the equipment provided with the relay described herein, but it can also be included in a device without said relay.

It is also proposed in this invention that the control device determines the closing of the safety electrovalve in response to a combination of signals obtained from the thermocouple and the infrared sensor. In this way, if there is a discrepancy between the readings obtained from the infrared sensor and the thermocouple, for example due to a malfunction of any of said components, the control device can interrupt the thermocouple signal to the safety electrovalve, causing it to close.

The infrared sensor may be adapted to detect the temperature in the different regions of the cooking zone (which it covers in its entirety) in a differentiated way, and to transmit this information to the control device, thus allowing differentiated regulation of the regulating electrovalves of each individual gas burner, or even to detect the size of a cookware arranged on the cooking zone by means of the aforementioned detection of differentiated temperature, thus achieving that the control device applies a regulation program adapted to said cookware size, for example by turning off the outermost gas burner of a group of ring burners.

The control device may also be configured to regulate the regulation electrovalves to maintain the temperature detected by the infrared sensor at a target temperature determined by the regulation program, so that it may increase or decrease the gas flow to maintain said constant temperature, since the gas flow will affect the temperature of the cooked food differently depending on the amount of water remaining in the cookware, or the amount of wind that may be in the installation area, for example.

According to another embodiment, the different control programs of the electronic control device correspond to different kitchen recipes adapted to different amounts of food and to different sizes of cookware, and where the interface allows a user to select a regulation program adapted to the size of the cookware placed on the cooking zone. This controls how many of the gas burners are necessary for cooking a recipe and regulates the time and intensity of applying heat to the specific characteristics of a recipe, a size of utensil, and a specific amount of food.

Likewise, the infrared sensor can be used by the control unit to detect the presence of a cookware over the cooking zone, allowing cooking to start after placing a cookware in said cooking zone and receiving a command from a user.

Likewise, the control device is configured to determine, by means of infrared sensor temperature readings, the intervention of a user on the cooking zone or the incorporation of ingredients at a different temperature from that of the cooking zone, and to proceed automatically in application of the regulation program.

For example, a user will be able to select on the interface a control program adapted to the preparation of a paella for six diners cooked in a paella sixty centimetres in diameter, and after arranging the said paella, with its ingredients inside, the cooking unit will be will be in charge of controlling the cooking process until it is completed without needing assistance, applying different temperature settings corresponding to different cooking phases, regulated by the applied regulation program, for example including an acoustic or light alarm to warn the user that cooking has been completed. Intermediate stages of cooking, such as adding an ingredient, may also be warned to the user by means of alarm signals.

The control unit will be able to detect that said intermediate cooking operations have been carried out by the user, either because the user notifies it through the interface, or because the control unit detects a variation in the signals received by the infrared sensor, for example a sudden decrease in temperature when adding water or another ingredient in the cooking zone.

The different control programs correspond to different cooking recipes and will therefore be adapted to different amounts of food and to different sizes of cookware. The control device can deduce, by means of temperature readings from the infrared sensor, the size of the cookware placed on the cooking zone, and automatically selects a regulation program adapted to said size.

According to one embodiment, the ignition source is a gas burner adjacent to said at least one gas burner and powered directly from the safety electrovalve.

In a preferred embodiment the at least one gas burner will comprise a plurality of concentric circular (or other annular configuration) gas burners, in which case the source of ignition is preferably a radial gas burner transversal to the other annular gas burners, and the safety electrovalve cuts off the supply of all gas burners including the ignition source.

Alternatively, the ignition source is contemplated to be an electric lighter, for example providing a spark. Said electric lighter will be adjacent to said at least one gas burner, and will be controlled from the control device so that said control device can actuate the electric lighter at the same time that it opens the passage of gas to the at least one gas burner.

In relation to the infrared sensor, it is also proposed that between said infrared sensor and the cooking zone a protective screen that integrates a germanium glass that is transparent to the infrared and resistant to temperatures of at least 200° C. is provided.

This protective screen will protect the infrared sensor from being damaged by exposure to excessive temperatures caused by cooking tasks. Different scenarios could cause such damage.

For example, if a flambé occurs, intentionally or accidentally setting fire to the contents of a cookware placed on the cooking zone, the flames could reach the infrared sensor and damage it or damage its protector if it were not resistant to high temperatures. Alternatively, a carelessly heated, high-temperature cookware could come into contact with the infrared sensor, damaging it or melting its shield if it were made of a fusible material such as plastic. In another scenario, superheated vapours, drops of oil or other high-temperature liquid from the surface of the cooked food, splashed on the infrared sensor could damage its lens or a hypothetical lens protector.

In any of these scenarios, the invention proposes a protective screen provided with an infrared-transparent germanium glass and resistant to temperatures of at least 200° C. that protects the infrared sensor and prevents the cooking unit from being damaged.

The infrared sensor is preferably housed in a protective housing arranged behind the protective screen.

The protective screen can also integrate a metallic screen around the infrared transparent element. In such a case, the metallic screen and the infrared transparent element can be flush with the face of the protective screen facing the cooking zone, thus facilitating the cleaning and hygiene of said protective screen.

According to an embodiment, the infrared transparent element is circular, is surrounded by a frustoconical and/or stepped perimeter annular face and is fitted into a complementary stepped and/or frustoconical circular opening provided in the metal screen. In this way, the infrared transparent element can be inserted into the complementary opening from the side not exposed to the cooking zone, being retained inside for example being pressed by the infrared sensor itself or another fixing element arranged in that face not exposed to the cooking zone. In this way, the infrared transparent element is fixed in position without the need for seals, frames, adhesives, or other fixing systems that could be damaged by heat.

It is also proposed that the infrared sensor is located at the end of a support arm, extended in elevation (so that the sensor can cover the entire visible surface of the food being cooked), attached to the rest of the cooking unit through a chassis, the entire assembly constituting a portable unit. Said arm could be detachable from the chassis for storage, maintenance, cleaning, transport, or repair.

It is also contemplated that the chassis of the cooking unit includes different fixing positions of the arm, thus allowing said arm to be mounted in different positions, for example depending on the place in which to position the cooking unit, the available space, or other criteria.

Said support arm will preferably be metallic and its distal end will constitute said metallic screen of the protective screen, the infrared sensor being hidden with respect to the cooking zone by the distal end of said arm, but being able to observe that cooking zone through an opening made in the aforementioned arm protected by the infrared transparent and heat resistant element.

It will also be understood that any range of values offered may not be optimal in their extreme values and may require adaptations of the invention for said extreme values to be applicable, said adaptations being within the reach of a person skilled in the art.

Other characteristics of the invention will appear in the following detailed description of an exemplary embodiment.

BRIEF DESCRIPTION OF THE DRAWINGS

The foregoing and other advantages and characteristics will be more fully understood from the following detailed description of an exemplary embodiment with reference to the accompanying drawings, which should be taken in an illustrative and not limitative way, in which.

DETAILED DESCRIPTION OF AN EMBODIMENT

The attached figures show embodiments of the present invention in an illustrative but not limitative manner.

Figure 1:
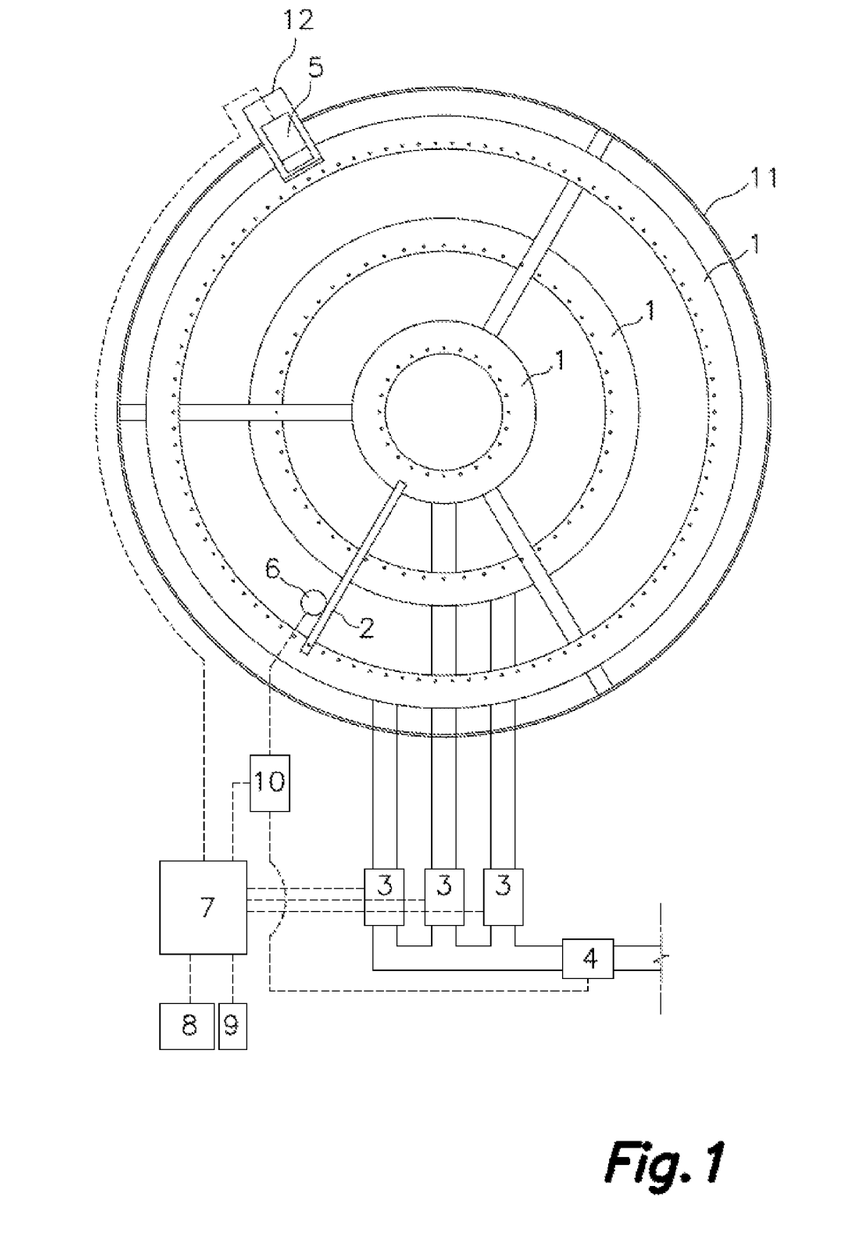
FIG. 1 is a schematic plan view of the food cooking unit according to an embodiment provided with three gas burners in the form of concentric rings, each independently controlled by means of a variable pitch regulating electrovalve, in which the electrical and electronic part is shown in a diagram form and where the data and current connections are indicated with a dashed line.

An exemplary embodiment is shown in FIG. 1 according to which the food cooking unit consists of three concentric annular gas burners 1, each consisting of a circular tube provided with multiple holes equidistant at the top radially distributed, sufficiently close so that a flame from one hole can ignite the gas expelled through the next hole. The set of gas burners 1 constitutes a cooking zone located immediately above said gas burners 1, where cookware supports allow a cookware to rest on said gas burners 1, being exposed to the heat generated by the combustion of the expelled gas through the holes. The area immediately above these cookware supports, located above the gas burners 1, constitutes a cooking area.

Although circular burners have been illustrated in the drawings, they may adopt other annular configurations, including one or more elements.

Each circular tube is connected to a separate gas supply conduit, each of said supply tubes being connected to a single variable pitch regulation valve 3 that determines the flow of gas supplied to each gas burner 1. The flow of supplied gas is distributed through the annular tube and exits through said plurality of orifices where an ignition source 2 ignites it causing the gas flow supplied by all the orifices to ignite.

The use of variable pitch regulation valves 3 according to an embodiment allows a precise regulation of the gas flow supplied, which cannot be done with a fixed pitch electrovalve.

It would be possible to implement this invention with the use of multiple regulation valves of different fixed pitch for the control of each individual gas burner 1, but this solution would require more complex and expensive plumbing to manufacture by having to connect several regulations to the same gas burner 1, in addition to occupying a larger volume. Therefore, the proposed solution of using variable-pitch regulation valves 3 is simpler, cheaper, and more compact The cooking unit is proposed to also include an electronic control device or control unit 7, integrating, for example, a PLC (programmable logic controller), or any other type of programmable electronic device with the capacity to apply a regulation program. Said control device 7 will have an interface 8 that will allow a user to be informed of different control parameters of the cooking unit, also allowing the user to select some regulation parameters of the control device 7, such as control sequences for the gas burners 1 adapted to different cooking recipes, or to different sizes of cookware.

The control device 7 is connected to regulating electrovalves 3, so that the gas flow supplied to gas burners 1 by said regulating electrovalves 3 is controlled by the control device 7 and corresponds to the program of regulation selected.

The cooking unit also includes an infrared sensor 5 located at the upper end of an arm 12, said infrared sensor 5 being above and focused on the cooking zone. This allows that, during the cooking of food in cookware located above the cooking zone, the infrared sensor 5 can measure the temperature of said food throughout the cooking zone it covers The infrared sensor 5 is connected to the control device 7 to which it transmits the collected information, and said control device 7 determines the precise regulation of the variable pitch regulation electrovalves 3 in response to the readings obtained by the infrared sensor 5 and in application of the program selected by the user through the interface 8.

As a result, a user will be able to place a cookware on the cooking zone, include the required ingredients in the necessary quantities, which can be notified to the user through the interface 8 of the control device 7, and activate the cooking. The cooking unit will be in charge of all the regulation and control of the intensity of the heat supplied to the food until its cooking is completed without requiring further user intervention.

The control device 7 also includes a data input 9, in this case a USB port or equivalent, which allows updating the control programs or incorporating new control programs, such as new recipes. Alternatively, it is contemplated that the data entry is remote by wireless means, for example by means of a WIFI, Bluetooth, 3G, 4G, 5G or similar communication protocol.

All the regulating electrovalves 3 receive a gas supply from the same gas source, for example a fixed installation connected to the gas distribution network, or to a gas supply cylinder, however a safety electrovalve 4 will be interposed that will allow the gas supply to the regulation electrovalves 3 to be completely closed, and with them also to all the gas burners 1.

The safety electrovalve 4 is a safety element that closes the gas passage in the event of an accidental extinguishing of the flame of the gas burners 1 that allows a free exit of the gas. Said safety electrovalve 4 will be controlled and activated by a thermocouple 6 in thermal contact with the cooking zone and connected to safety electrovalve 4.

Typically the ignition source 2 will be a radial gas burner transversal to the other annular gas burners 1, which will have a constant gas supply regardless of the regulation of the regulation electrovalves 3, that is to say that when all the regulation electrovalves 3 are completely closed ignition source 2 will continue to receive a sufficient gas supply to keep a flame burning. Said gas supply from the ignition source 2 may be regulated from the safety electrovalve 4, so that the closure of said safety electrovalve 4 will also close gas supply to the ignition source 2.

Other alternatives are also contemplated, such as for example that the ignition source is an electric spark generator, which would not require a specific gas supply, however even in this scenario the safety electrovalve 4 would still be useful to guarantee a total closure of all gas supply to gas burners 1.

To control the activation of the safety electrovalve 4, a thermocouple 6 is arranged in thermal contact with the cooking zone that is to say in thermal contact with the heat produced by the flames of the gas burners 1. In the present embodiment, the thermocouple 6 is in thermal contact with the flame of the ignition source 2

Subjected to said heat, the thermocouple 1 generates a weak electrical signal that is transmitted to the safety valve 4 through a conductor cable. When the thermocouple 6 cools down, supposedly due to the accidental extinguishing of the flame of the gas burners 1, the electrical signal is interrupted and the safety electrovalve 4 closes the gas passage completely closing off the cooking unit.

The electrical signal generated by the thermocouple 6 is extremely weak and the transmission of said signal to the safety electrovalve 4 suffers from losses due to the electrical resistance of the interposed elements, causing frequent false positives that close the gas supply unnecessarily. Furthermore, typically said conductor cable also includes a switch that allows a voluntary closing of the safety electrovalve 4 interrupting the electrical signal, said switch and its connections adding greater electrical resistance to the transmission of the signal In the present embodiment, it is proposed to dispense with said switch and to place, between the thermocouple 6 and the safety electrovalve 4, only one relay, preferably an oversized relay 10 by at least a factor of 1000. This allows reducing the power losses of the electrical signal generated by thermocouple 6, minimizing the connections between the two elements.

The relay 10 is in turn connected to the control device 7 thus allowing the control device 7 to detect the signal generated by the thermocouple 6. Thus, if the electrical signal generated by thermocouple 6 is interrupted, the control device 7 can interrupt the regulation program that is running, and also notify the user that such interruption has occurred, for example by means of a light or acoustic warning signal.

The control device 7 cannot prevent the safety electrovalve 4 from closing in the event that the signal generated by the thermocouple 6 is interrupted, however, it can intentionally interrupt said signal through the relay 10. This allows that the device control 7 can actuate the closing of the safety electrovalve 4, and therefore control the total closure of the gas supply, for example when the control device 7 is turned off, or when the selected program stops being applied.

Figure 4:
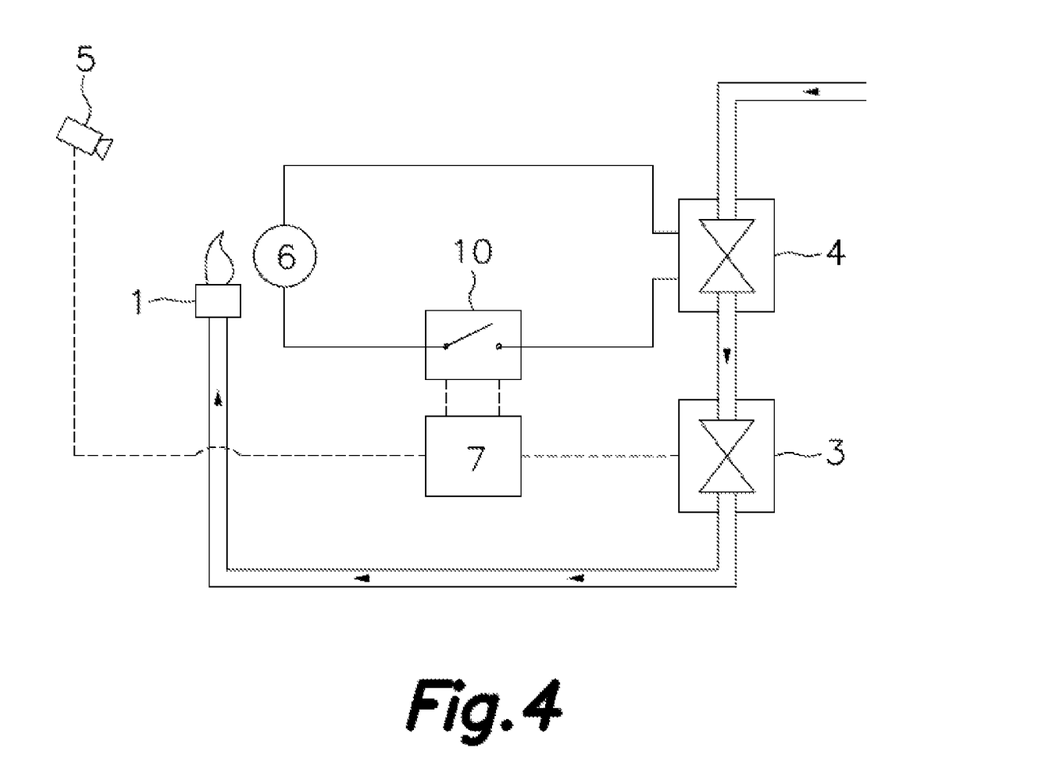
FIG. 4 shows a simplified diagram of an aspect of the present invention showing a gas line represented with a double line, which passes through a safety electrovalve, a regulating electrovalve and ending in a gas burner, an indicated electrical circuit with a continuous line that communicates a thermocouple, adjacent to the burner flame, with the safety electrovalve or a relay that acts as a switch, and data connections shown in a dashed line that communicate the regulation electrovalve, the relay, and an infrared sensor with a control unit.

A simplified version of this solution, but including a single gas burner, is shown schematically in FIG. 4, where it can be seen that the control unit 7 does not have a direct connection with the safety electrovalve 4, but only has a connection with the relay 10, which allows it to interrupt the communication between the thermocouple 6 and the safety electrovalve 4 when the user wants to close the cooking unit or when the program determines that the cooking unit must be closed, but not being possible that the control unit could prevent the closing of the safety electrovalve 4 when the thermocouple stops sending a signal. As indicated, the aforementioned electronic thermocouple control arrangement also makes it possible to avoid false positives by delaying at will the thermocouple signal for a sufficient time to determine a closure of the safety electrovalve, when an uncontrolled gas leak has indeed occurred.

Figure 2:
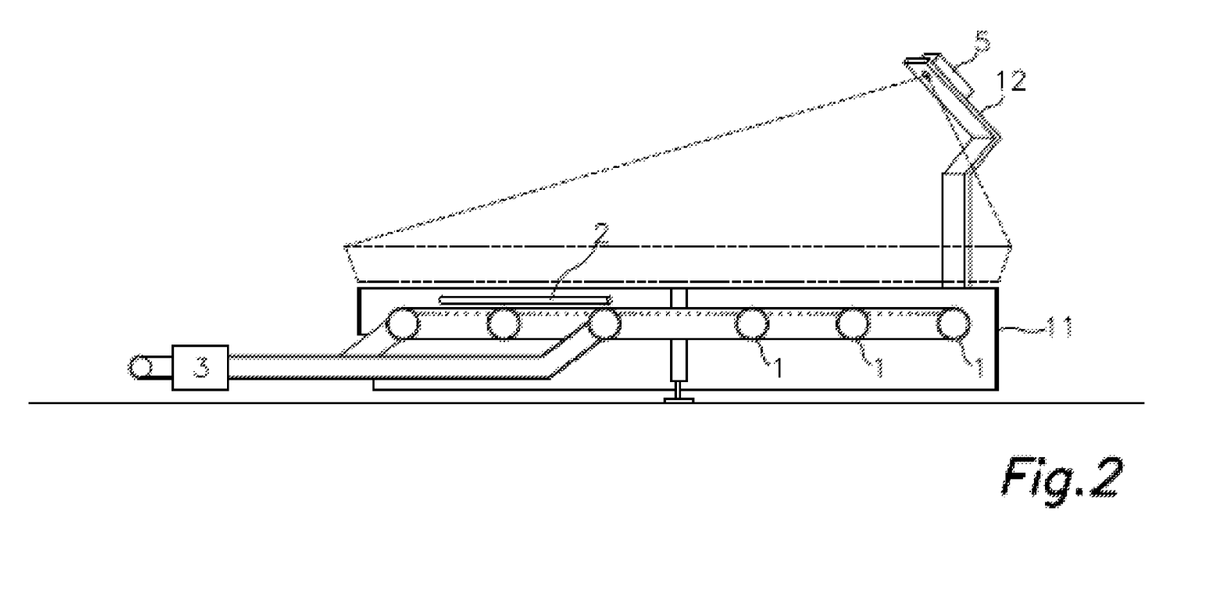
FIG. 2 is a schematic longitudinal section of the food cooking unit shown in FIG. 1, in which the electrical and electronic parts have not been included, and in which a possible cooking utensil in the form of paella arranged on the cooking zone and also the field of vision of the infrared sensor that covers the entire visible surface of a food contained in the cookware.
Figure 3:
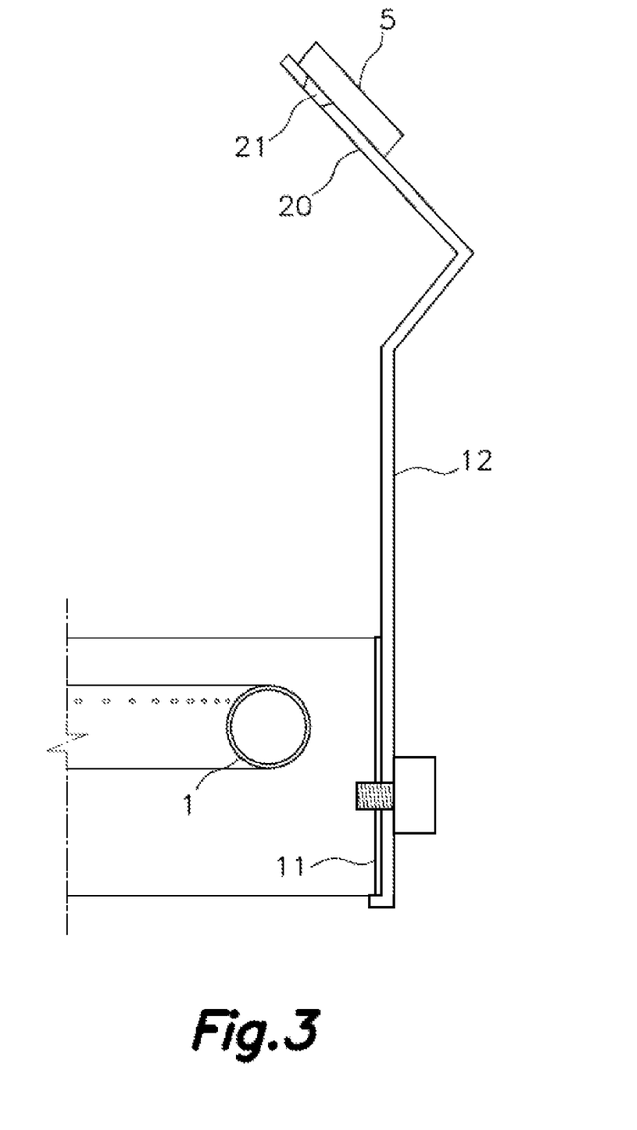
FIG. 3 shows an enlarged view of a vertical section of the arm that holds the infrared sensor.

Preferably, the entire assembly that constitutes the cooking unit is supported on a chassis 11 (see FIG. 2), which includes support legs and an external partition or panel that surrounds the cooking zone as protection. The arm 12 that supports the infrared sensor 5 will, in this embodiment, be fixed on said chassis 11, for example by means of a screw with a manually operated knuckle, as shown in FIG. 3. This allows to fix and release the arm from the rest of chassis 11 manually, facilitating maintenance, replacement, cleaning, and transport-storage tasks. Furthermore, multiple fixing points can be provided on the chassis 11 allowing the position of the arm 12 to be modified according to the location or the preference of the user, which is of particular interest when several cooking units are arranged adjacent to each other.

Said arm 12 will be, for example, a metal plate whose upper end will be inclined at an angle, facing towards the centre of the cooking zone. At said upper end there will be an opening where an infrared transparent element 21 will be housed, after which the infrared sensor 5 will be placed. This construction allows the distal end of the arm 12 to act as a protective screen 20, which will preferably be metallic or made of another heat-resistant and flame-retardant material, protecting the infrared sensor 5 from heat or possible flames occurring in the cooking zone, since said infrared sensor 5 will be behind the protective screen 20.

The transparent infrared element 21, which will preferably be a germanium glass, is resistant to temperatures above 200° C., and allows infrared light to pass through it, not interfering with the infrared sensor 5.

According to a preferred construction, the distal end of the arm 12, which acts as a protective screen 20, will have a wider frustoconical hole on the side remote from the cooking zone. In this frustoconical hole a germanium glass will also be inserted with a frustoconical shape complementary to the shape of the hole. Subsequently, the infrared sensor 5 is superimposed on said germanium glass and is fixed on the back of said protective screen 20, thus being retained in its position without the need for adhesives that could be damaged by high temperatures.

Figure 5:
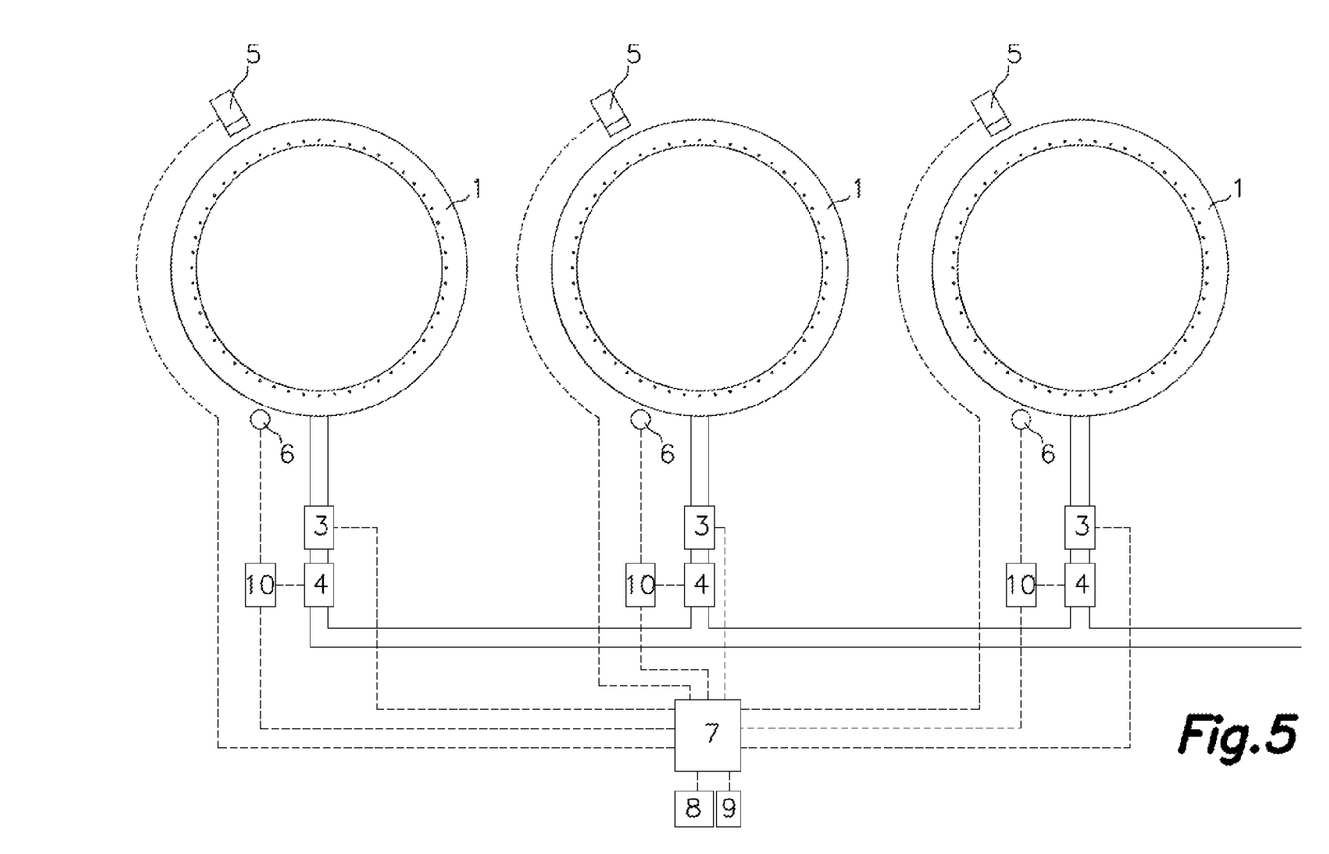
FIG. 5 shows a schematic plan view of the food cooking unit according to an embodiment equipped with three spaced circular gas burners, each defining a different cooking area equipped with an infrared sensor and a thermocouple in connection with an safety electrovalve through a relay, with all infrared sensors, all relays and all regulation valves controlled from a single electronic control device or centralized control unit.

According to a further proposed embodiment, shown schematically in FIG. 5, the food cooking unit may have multiple gas burners 1 spaced apart from each other, each defining a different cooking zone and controlled by an independent regulation valve 3, thus allowing simultaneous cooking of several dishes.

In an alternative embodiment, it is provided that each gas burner 1 is supplied with gas through a single variable-pitch regulation valve 3.

In this embodiment, a single gas burner 1 has been shown in each cooking zone, but obviously each cooking zone can consist of multiple gas burners 1, similar to the one shown in FIG. 1, for example.

The gas burners 1 of each cooking zone will have an associated infrared sensor 5, directed to the corresponding cooking zone and a thermocouple 6 to control that the flame of the gas burner 1 is not accidentally extinguished. Thermocouple 6 will be connected to a safety electrovalve 4 through a relay allowing cutting off the gas supply from that gas burner 1 if the flame is extinguished, in a manner identical to that previously described in other embodiments.

In an exemplary embodiment, all infrared sensors 5, all regulating electrovalves 3 and all relays will be connected and controlled by a single centralized electronic control device 7, thus reducing costs and improving control.

In this example the presence of a safety electrovalve 4 associated with the burners of each cooking zone has been shown, however it is understood that there could be a single general safety electrovalve 4 that would close the gas supply to all burners if any of thermocouples 6 will detect a flame out.

Although in FIG. 5 the different gas burners 1 have been graphed next to each other, it is understood that they could also be stacked on top of each other, thus achieving a compact structure that would allow many dishes to be cooked simultaneously in little space. Preferably such a construction will have a shared chassis or structure that will support all the gas burners 1 in said overlapping positions, as well as all the other associated elements that make up the cooking unit. Thus, the gas burners:

- are spaced apart in a vertical direction, defining overlapping cooking zones, or
- They are spaced apart in a vertical direction and separated by screens, defining overlapping cooking zones.

It is also foreseen that the cooking unit also integrates, in connection with the electronic control device 7, various sensors selected from:

- weight sensors arranged to detect the presence of the cooking utensil, increases in weight of the cooking unit, or parts thereof;
- weight sensors arranged to detect weight increases of the cooking unit, or parts thereof, the electronic control device 7 being configured to notify a user of the need to incorporate a quantity of a new ingredient in the area of cooking and to notify the user when the increase in weight detected by the weight sensor coincides with the amount of the new ingredient to be incorporated so that it stops the incorporation of said new ingredient;
- weight sensors arranged on legs of the cooking unit to detect increases in weight of the cooking unit or on a cookware support, configured to hold a cookware in the cooking zone, to detect the presence or the increase in weight of the cookware.
- level sensor configured to detect the horizontality of the cooking unit, or part thereof;
- level sensor configured to detect the horizontality of the cooking unit or part thereof, the electronic control device 7 being configured to determine and notify a user of a necessary adjustment of each of a plurality of height legs adjustable of the cooking unit, or of a cookware support, the cookware support being adjustable in inclination and being configured to hold a cookware in the cooking zone;
- level sensor configured to detect the horizontality of the cooking unit or part thereof, the electronic control device 7 being configured to determine a necessary adjustment of each one of a plurality of height adjustable legs of the cooking unit, or of a cookware support, the cookware support being adjustable in inclination and being configured to hold a cookware in the cooking zone, and to automatically operate actuating means configured to actuate said height legs adjustable or said cookware support.
- pressure sensor of the gas supply that feeds the cooking unit, the electronic control device 7 being configured to apply or adjust the regulation programs in response to the readings of said pressure sensor;
- atmospheric pressure sensor, the electronic control device 7 being configured to apply or adjust the regulation programs in response to the readings of said atmospheric pressure sensor;
- environmental humidity sensor, the electronic control device 7 being configured to apply or adjust the regulation programs in response to the readings of said environmental humidity sensor;

room temperature sensor, the electronic control device 7 being configured to apply or adjust the regulation programs in response to the readings of said room temperature sensor;

internal temperature sensor that includes a probe needle insertable in a food located on the cooking zone, the electronic control device 7 being configured to apply or adjust the regulation programs in response to the readings of said internal temperature sensor;

In one embodiment, an electric battery integrated in the cooking unit or associated with the electronic control device 7 is provided, which will supply electrical energy to the latter and to the sensors connected to it.

According to an exemplary embodiment, the cooking unit further includes a vibrating device attached to the cooking unit or to a cookware support configured to hold a cookware in the cooking zone, the vibrating device being controlled by the electronic control device 7 in application of the regulation programs. In this exemplary embodiment, the cooking unit also preferably includes a cookware fixing device which can be selected from:

- magnet or electromagnet;
- adjustable clamps;
- elastic clamps;
- adjustable radial stops.

In accordance with another embodiment, it is provided that the electronic control device 7 of the cooking unit includes a proportional, integral and derivative controller configured to regulate the regulating electrovalves 3, adapting its flow rate, increasing it if it is below a target temperature or threshold value (referenced by sensor 5) or decreasing it if it exceeds the mentioned target temperature. This increase or decrease may be a maximum or a minimum depending on the orders that are established by the control unit 7, according to the program executed by said unit.

In relation to structural aspects of the cooking unit, it has also been provided that all the elements of the cooking unit other than the gas burners 1 form an auxiliary assembly, where the gas burners 1 are housed and connected to said auxiliary assembly and connected to the corresponding regulation valves 3 only by releasable connections accessible from the outside of the auxiliary assembly, and where the auxiliary assembly has a dimensioned passage for the free extraction of the gas burners 1 from the interior therethrough.

Likewise, and to facilitate maintenance tasks, in one embodiment, it is provided that each gas burner 1 is connected to a corresponding regulation valve 3 by means of a rigid duct that is interspersed with a section of gas injector, which contains an injector adapted to the type of gas supplied to the gas burner 1, the injector section being connected to the rest of the rigid duct by releasable connections and the injector section being removable in a transverse direction with respect to the rigid duct.

Alternatively, it is contemplated that the gas burners 1 and the associated elements that make up each cooking zone can be modules that can be added at will by connecting them to a central module that contains the electronic control device 7 and optionally also the regulation 3 and safety 4 electrovalves.

It will be understood that the different parts constituting the invention described in one embodiment can be freely combined with the parts described in other different embodiments even though said combination has not been explicitly described, as long as there is no harm in the combination.

The invention claimed is:

1. Food cooking unit comprising:
    at least one gas burner associated with an ignition source and on which a cooking zone is defined to which the at least one gas burner applies heat by burning a gas flow supplied to the at least one gas burner;
    at least one regulating electrovalve that regulates the gas flow supplied to said at least one gas burner;
    at least one infrared sensor located above the cooking zone and focused towards said cooking zone for remote detection of the temperature of a food cooked in said cooking zone;
    an electronic control device connected to said at least one infrared sensor and to said at least one regulating electrovalve for its control and regulation;
    at least one thermocouple in thermal contact with the flames that apply heat to the cooking zone and in connection with a safety electrovalve to close a gas flow in the event of extinguishing the flames that apply heat to the cooking zone;
    the thermocouple is directly connected to the safety electrovalve through a relay which in turn is connected to the electronic control device;
    a thermal protection screen transparent to the infrared light is placed between said at least one infrared sensor and the cooking zone;
    the electronic control device stores different regulation programs of the regulation electrovalves and safety electrovalve, and is configured to regulate said at least one regulation electrovalve and to close the safety electrovalve in application of one of the regulation programs and/or in response to the signals obtained from the at least one infrared sensor.

2. Cooking unit according to claim 1, wherein said relay is oversized in power, oversized by at least a factor of 100, or oversized by at least a factor of 1000, to minimize losses in the signal generated by the thermocouple.

3. Cooking unit according to claim 1, wherein the relay is integrated in a printed circuit board that integrates the electronic control device.

4. Cooking unit according to claim 1, wherein the electronic control device comprises a detector configured:
    to detect, through the relay, a fire extinguish signal produced by the thermocouple, the control device being configured to control the relay allowing the closing of the safety electrovalve by interrupting the signal generated by the thermocouple in response to said fire extinguish signal; or
    to detect, through the relay, a fire extinguish signal produced by the thermocouple, the control device being configured to confirm said fire extinguishing signal during a confirmation delay to avoid false positives, and to control the relay allowing the closing of the safety electrovalve by interrupting the signal generated by the thermocouple in response to said confirmed fire extinguish signal; or
    to detect, through the relay, a fire extinguish signal produced by the thermocouple, the control device being configured to emit warnings in response to the fire extinguish signal; or
    to detect, through the relay, a fire extinguish signal produced by the thermocouple, the control device being configured to confirm said fire extinguishing signal during a confirmation delay to avoid false positives and to emit warnings in response to the confirmed fire extinguish signal.

5. Cooking unit according to claim 1, wherein the electronic control device further:
- includes a data input to receive modifications of the stored regulation programs;
- is connected to an interface for the selection, by a user, of the applicable regulation program;
- is connected to an interface for the selection, by a user, of the applicable regulation program selected from different stored regulation programs corresponding to different kitchen recipes adapted to different amounts of food and/or to different sizes of cookware;
- is configured to determine, by means of temperature readings from the infrared sensor, the size of the cookware placed on the cooking zone, and to automatically select a regulation program adapted to said detected size;
- is configured to determine, by means of temperature readings from the infrared sensor, the presence of a cookware placed over the cooking zone, and to automatically start a regulation program;
- is configured to determine, by means of temperature readings from the infrared sensor, the intervention of a user on the cooking zone or the incorporation of ingredients at a different temperature from that of the cooking zone, and to proceed automatically in application of the regulatory program; or
- any combination of one, or more, of the above.

6. Cooking unit according to claim 1, wherein said cooking unit furthermore integrates, in connection with the electronic control device, sensors selected from:
- weight sensors arranged to detect the presence of a cookware, increases in weight of the cooking unit or of parts thereof;
- weight sensors arranged to detect increases in weight of the cooking unit or parts thereof, the electronic control device being configured to notify a user a required addition of a quantity of a new ingredient to the cooking zone and to notify the user when the weight sensor detects an increase in weight coincident with the amount of the quantity of the new ingredient to be incorporated for stopping the incorporation of said new ingredient;
- weight sensors arranged on legs of the cooking unit to detect increases in weight of the cooking unit or on a cookware support, configured to hold a cookware in the cooking zone, to detect the presence or the increase in weight of the cookware;
- level sensor configured to detect the horizontality of the cooking unit, or part thereof;
- level sensor configured to detect the horizontality of the cooking unit or part thereof, the electronic control device being configured to determine and notify a user of a necessary adjustment of each of a plurality of height adjustable legs height of the cooking unit, or a cookware support, the cookware support being adjustable in inclination and being configured to hold a cookware in the cooking area;
- level sensor configured to detect the horizontality of the cooking unit or part thereof, the electronic control device being configured to determine a necessary adjustment of each one of a plurality of height adjustable legs of the unit, or a cookware support, the cookware support being adjustable in inclination and being configured to hold a cookware in the cooking zone, and to automatically operate actuation means configured to actuate said height adjustable legs or said cookware support.

7. Cooking unit according to claim 1, wherein said cooking unit also integrates, in connection with the electronic control device, sensors selected from:
- gas supply pressure sensor of a gas feeding the cooking unit, the electronic control device being configured to apply or adjust the regulation programs in response to the readings of said pressure sensor;
- atmospheric pressure sensor, the electronic control device being configured to apply or adjust the regulation programs in response to the readings of said atmospheric pressure sensor;
- environmental humidity sensor, the electronic control device being configured to apply or adjust the regulation programs in response to the readings of said environmental humidity sensor;
- room temperature sensor, the electronic control device being configured to apply or adjust the regulation programs in response to the readings of said room temperature sensor;
- internal temperature sensor including a probe needle insertable in a food located on the cooking zone, the electronic control device being configured to apply or adjust the regulation programs in response to the readings of said internal temperature sensor.

8. Cooking unit according to claim 1, wherein the cooking unit integrates an electric battery that supplies electrical energy to the electronic control device and to the sensors connected thereto.

9. Cooking unit according to claim 1, wherein the cooking unit includes at least one vibrator device attached to the cooking unit or to a cookware support configured to hold a cookware in the area of cooking, the vibrator device being controlled by the electronic control device in application of the regulation programs.

10. Cooking unit according to claim 9, wherein the cooking unit includes a cookware fastener device, or a cookware fastener device selected among:
- magnet or electromagnet;
- adjustable clamps;
- elastic clamps;
- adjustable radial stops.

11. Cooking unit according to claim 1, wherein the at least one gas burner is a plurality of spaced apart gas burners defining distinct cooking zones, the gas burners of each cooking zone being associated with an infrared sensor and a thermocouple connected to a safety electrovalve through a relay, all the infrared sensors and all the relays in connection with a single centralized electronic control device in charge of regulating all the regulation electrovalves of all the gas burners.

12. Cooking unit according to claim 11, wherein the gas burners:
- are spaced apart in a vertical direction, defining overlapping cooking zones, or
- are spaced apart in a vertical direction and separated by screens, defining overlapping cooking zones.

13. Cooking unit according to claim 1, wherein the electronic control device includes a proportional, integral and derivative controller configured to regulate, under the control of said electronic control device, the regulating electrovalves adapting an increasing or decreasing gas flow rate if the temperature detected by the sensor exceeds or falls below a target temperature value.

14. Cooking unit according to claim 1, wherein the protective screen integrates a germanium glass resistant to temperatures of at least 200° C. and to flames.

15. Cooking unit according to claim 14, wherein the infrared sensor:
- is housed in a protective casing arranged behind the protective screen;
- integrates, around the germanium glass transparent to the infrared, a metallic screen, or a heat resistant and fireproof material;
- integrates a metal screen equipped with a stepped and/or frustoconical circular opening arranged around the germanium glass, which is circular and is surrounded by a frustoconical and/or stepped perimeter annular face complementary to the circular opening, said germanium glass being fitted in said circular opening;
- is located at the end of a support arm, which extends in elevation, joined to the rest of the cooking unit through a chassis; or
- any combination of one, or more, of the above.

16. Cooking unit according to claim 1, wherein each gas burner is supplied with gas through a single variable-pitch regulation electrovalve.

17. Cooking unit according to claim 1, wherein the ignition source is:
- a gas burner supplied directly from the safety electrovalve and adjacent to said at least one gas burner to be ignited; or
- an electric lighter adjacent to said at least one gas burner to be ignited, controlled from the electronic control device.

18. Cooking unit according to claim 1, wherein the at least one gas burner comprises a plurality of concentric circular gas burners.

19. Cooking unit according to claim 1, wherein all the elements of the cooking unit other than the gas burners constitute an auxiliary assembly, where the gas burners are housed and connected to said auxiliary assembly and connected to the corresponding regulation valves only by releasable connections accessible from the outside of the auxiliary assembly, and where the auxiliary assembly has a dimensioned passage for the free extraction of the gas burners therethrough.

20. Cooking unit according to claim 1, wherein each gas burner is connected to a corresponding regulation valve by means of a rigid duct with an injector section inserted, containing a gas injector adapted to the type of gas supplied to the gas burner, the injector section being connected to the rest of the rigid duct by releasable connections and the injector section being removable in a transversal direction with respect to the rigid duct.

* * * * *